No. 691,615. Patented Jan. 21, 1902.
R. C. ELLIOTT & C. HOLLIWELL.
MEANS FOR PRODUCING FUDGE OR LATE NEWS LINOTYPES.
(Application filed July 23, 1901.)
(No Model.) 5 Sheets—Sheet 1.
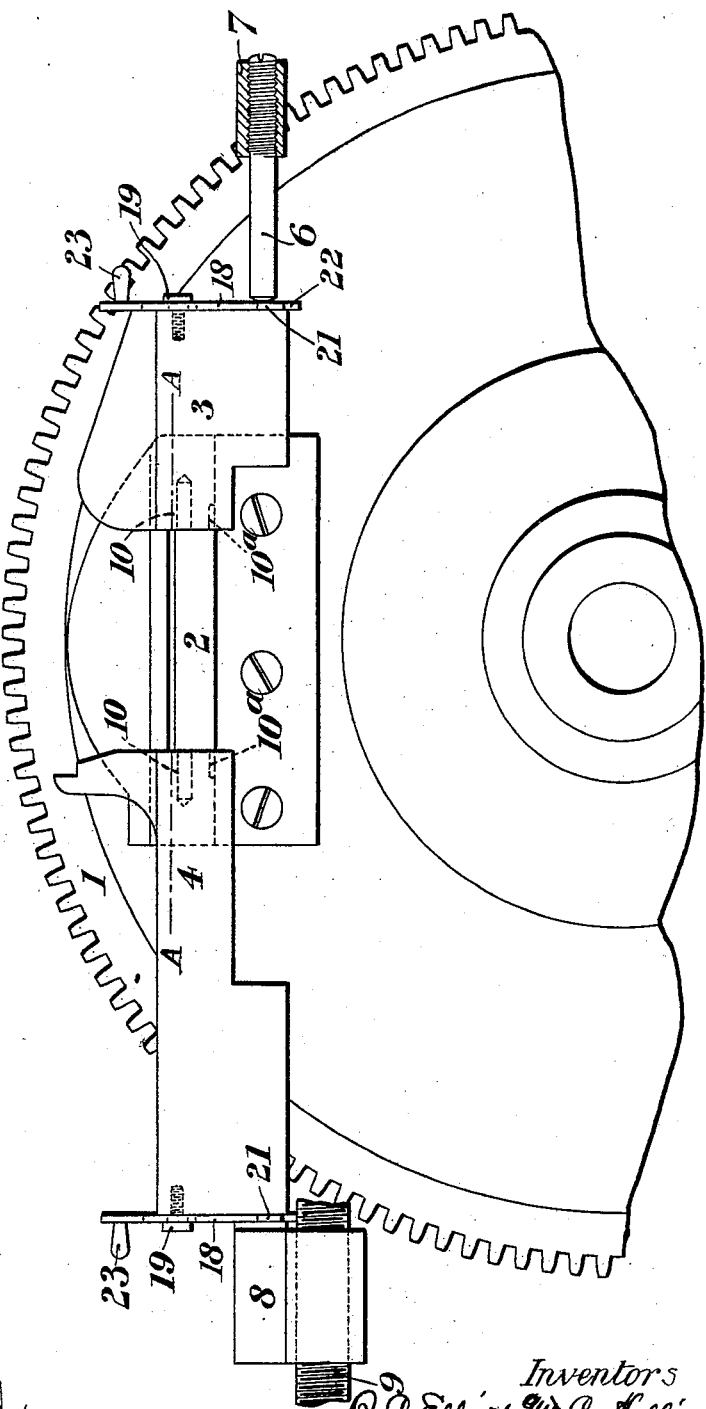

No. 691,615. Patented Jan. 21, 1902.
R. C. ELLIOTT & C. HOLLIWELL.
MEANS FOR PRODUCING FUDGE OR LATE NEWS LINOTYPES.
(Application filed July 23, 1901.)
(No Model.) 5 Sheets—Sheet 2.
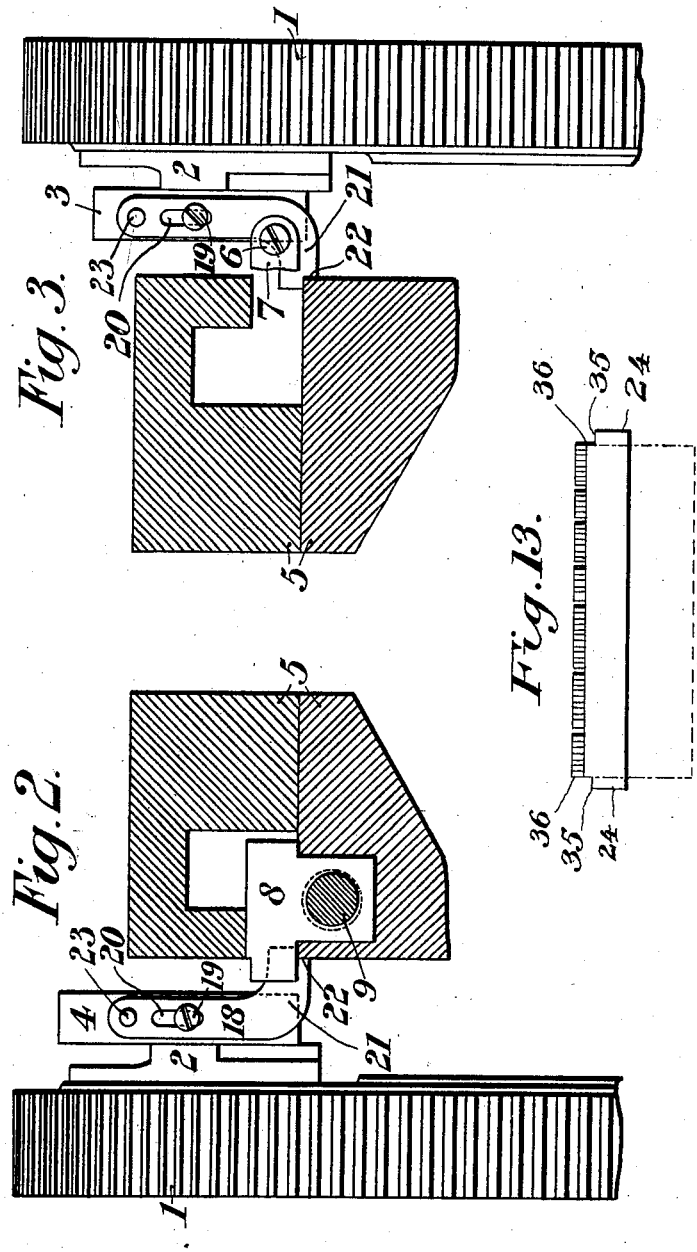

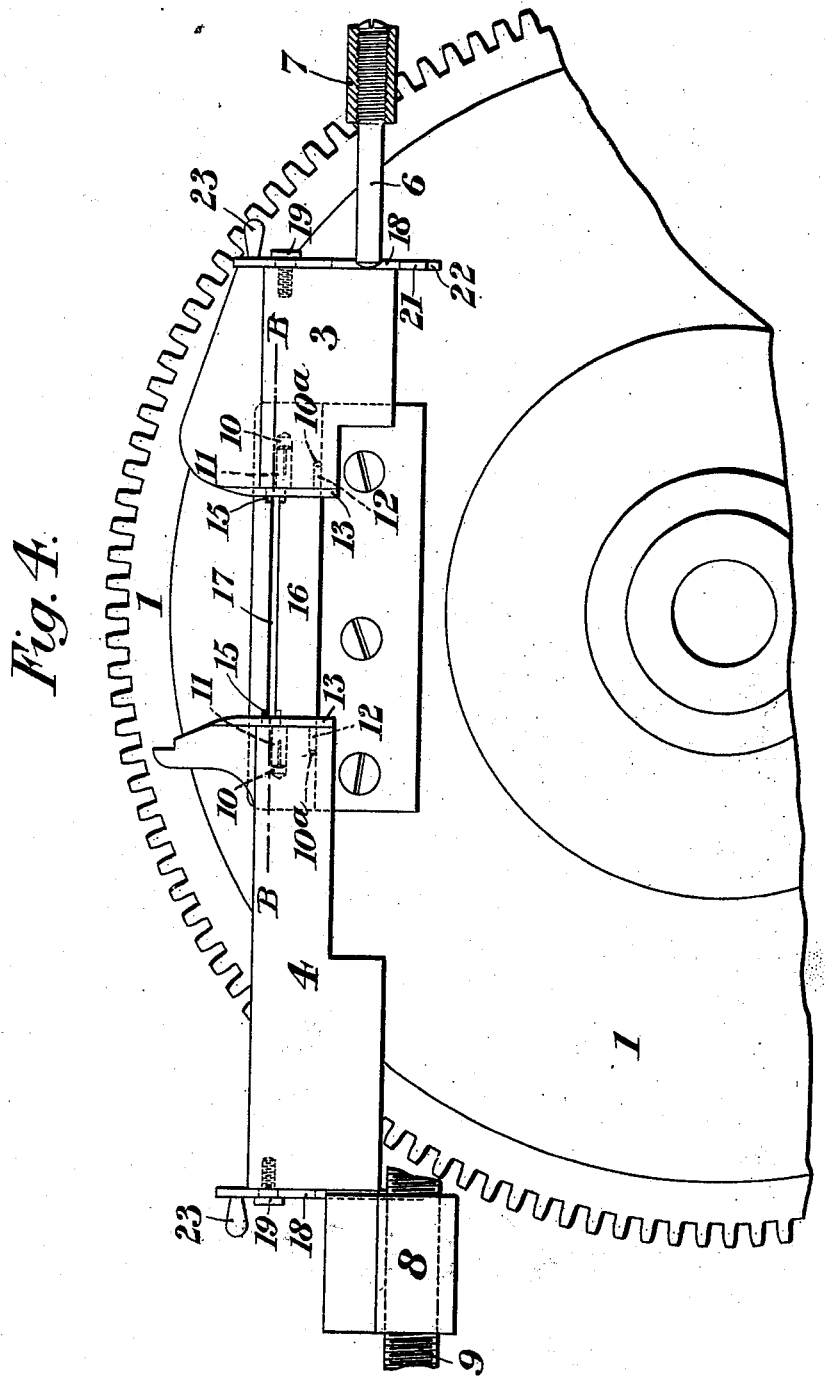

No. 691,615. Patented Jan. 21, 1902.
R. C. ELLIOTT & C. HOLLIWELL.
MEANS FOR PRODUCING FUDGE OR LATE NEWS LINOTYPES.
(Application filed July 23, 1901.)
(No Model.) 5 Sheets—Sheet 4.
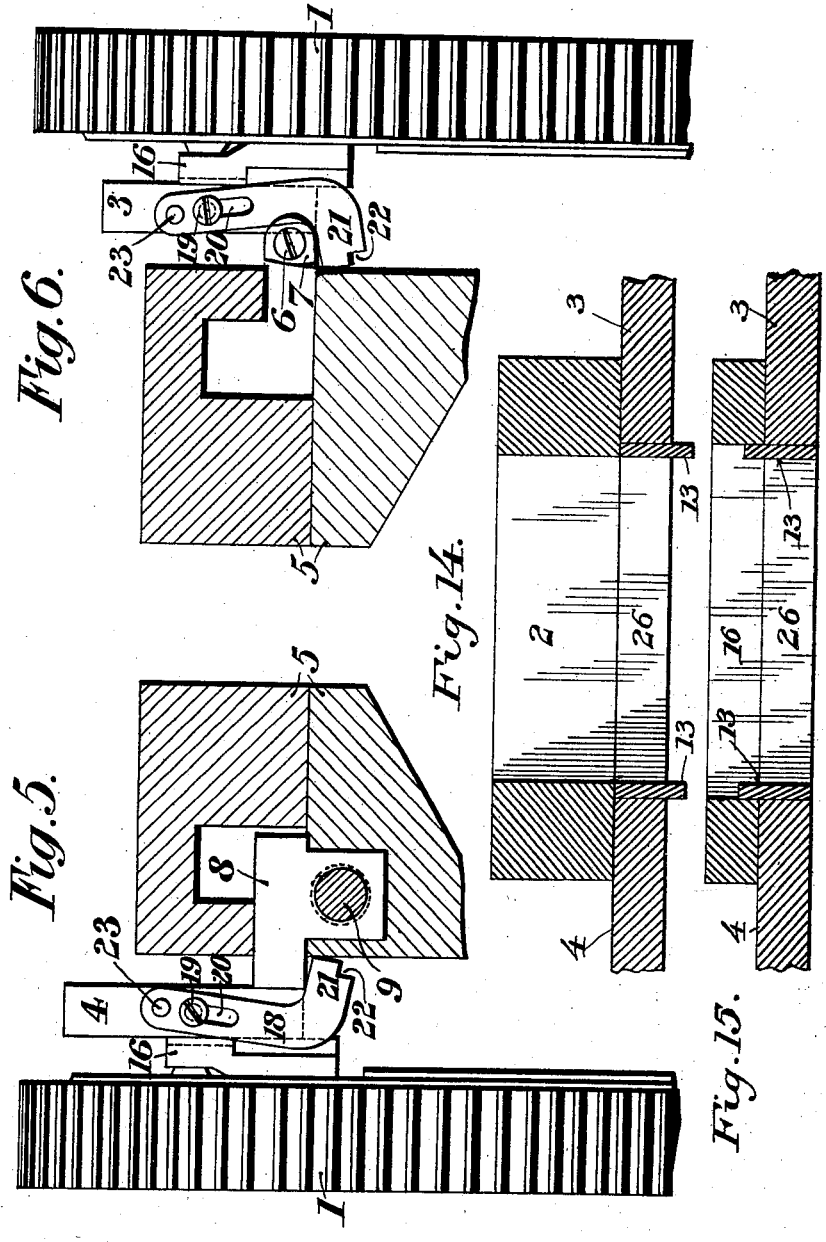
Witnesses
A. M. E. Kennedy.
F. S. Elmore
Inventors
R. C. Elliott and C. Holliwell
per Philip T. Dodge
Attorney.

No. 691,615. Patented Jan. 21, 1902.
R. C. ELLIOTT & C. HOLLIWELL.
MEANS FOR PRODUCING FUDGE OR LATE NEWS LINOTYPES.
(Application filed July 23, 1901.)
(No Model.) 5 Sheets—Sheet 5.
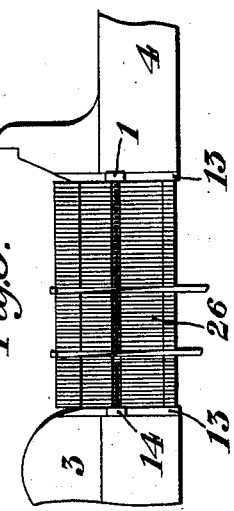
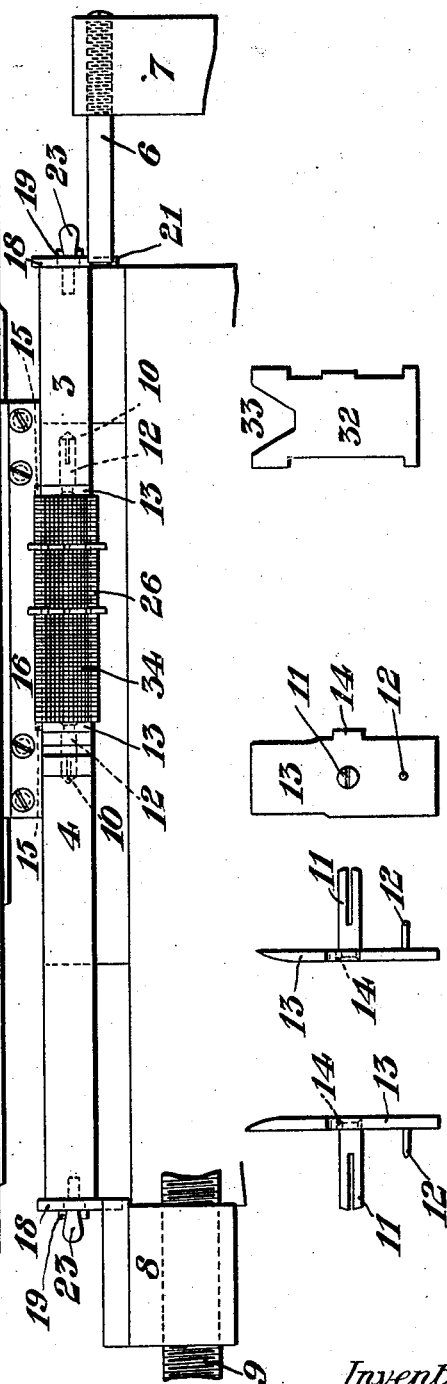
Witnesses
Inventors
R. C. Elliott and C. Holliwell
per Philip T. Dodge
Attorney

UNITED STATES PATENT OFFICE.

RICHARD CORNELIUS ELLIOTT AND CHARLES HOLLIWELL, OF BROADHEATH, ENGLAND, ASSIGNORS TO THE MERGENTHALER LINOTYPE COMPANY, OF NEW YORK, N. Y.

MEANS FOR PRODUCING FUDGE OR LATE-NEWS LINOTYPES.

SPECIFICATION forming part of Letters Patent No. 691,615, dated January 21, 1902.

Application filed July 23, 1901. Serial No. 69,353. (No model.)

*To all whom it may concern:*

Be it known that we, RICHARD CORNELIUS ELLIOTT and CHARLES HOLLIWELL, of The Linotype Works, Broadheath, in the county of Chester, England, have invented certain new and useful Improvements in Fudge or Late-News Linotypes, Means for Molding Them, and Means for Holding Them in Printing Position; and we do hereby declare the following to be a full, clear, and exact description of the invention, such as will enable others skilled in the art to which it appertains to make and use the same.

The present invention relates to improvements in means for producing fudge or late-news linotypes. It is specially applicable for fudge-linotypes cast by the linotype-machine described in the specification of Letters Patent No. 436,532, dated September 16, 1890, and in the mold described in the specification of British Letters Patent No. 22,107, dated December 5, 1900.

According to the present invention the printing edge of the fudge-linotype produced thereby is of normal length, and the body of it is prolonged at each end past such length for a sufficient distance, thereby producing a special projection at each end to engage under the fudge-cavity ledges or their equivalents. The height of these projections is fixed by a projection on a special matrix-quad, which the operator composes at each end of the composed line of matrices or type-dies, as the case may be, and outside its normal length.

There is a special mold for casting the fudge-linotypes with its slot or mold proper longer than the printing edge of the linotypes. This elongated mold is used with special quads set against the ends of the line of matrices and having projections to enter and fill the ends of the mold at the front in order to form indentations in the front corners of the linotype cast in the mold against them.

Figure 1 is a front elevation of a portion of the mold wheel and vise and other adjacent parts of the machine arranged for casting linotypes of ordinary depth. Figs. 2 and 3 are sectional elevations looking from, respectively, the left and right hand ends of Fig. 1, with the vise shown in a more complete form—that is to say, with the guides thereof. Figs. 4, 5, and 6 are views corresponding, respectively, with Figs. 1, 2, and 3, showing the same apparatus arranged for casting fudge-linotypes. Fig. 7 is a plan of Fig. 4, showing a line of matrices in position and the apparatus otherwise ready for the casting operation. Fig. 8 is a rear or face view of the matrices and adjacent parts of the vise-jaws as arranged in Fig. 7. Figs. 9 and 10 are front views of the pair of matrix-quads represented in Figs. 4, 7, and 8. Fig. 11 is an elevation of the right-hand side of Fig. 10. Fig. 12 is a side elevation of an alternative form of matrix-quad. Fig. 13 is an elevation of one of the improved fudge-linotypes, showing in dotted lines the relative size and shape of an ordinary linotype cast in the same machine. Fig. 14 is a horizontal section on the line A A of Fig. 1, showing the parts adjusted to cast ordinary type-high linotypes; and Fig. 15 a corresponding section on the line B B of Fig. 4, showing the parts adjusted to cast the low or fudge linotypes with shoulders at the ends.

Throughout the several figures of the drawings the same numerals of reference are used to indicate like or corresponding parts.

Referring first to Figs. 1, 2, and 3, 1 is the mold-wheel, to which intermittent partial rotation is imparted in the usual well-known manner.

2 is the mold-block, secured on the wheel 1, for casting ordinary linotypes—*i. e.*, linotypes of type-height.

3 and 4 are the vise-jaws for confining the line of matrices in front of the mold, the former being capable of a short horizontal movement in the stationary guides 5, this movement being limited in one direction by the stop-screw 6, adjustable in the fixed lug 7 and the latter (the movable jaw) adjustable as to the farthest position it is allowed to move to away from the jaw 3 by the stop-nut 8, which may be adjusted to any desired position, according to the length of linotypes to be cast by turning the vise-screw 9.

All the parts just enumerated are as heretofore, excepting as regards the vise-jaws 3 and 4, which are recessed, as hereinafter described.

The face of each of the vise-jaws 3 and 4 is formed with two holes or recesses 10 and 10ª, the former to receive a preferably split and tightly-fitting dowel-pin 11 and the latter to receive a steadying-pin 12, both of which pins are secured to and project from the back or outer face of a matrix-quad 13, (see Figs. 9, 10, and 11,) which by these means is capable of being readily attached to the vise-jaws when fudge-linotypes are to be cast and detached from the vice-jaws when ordinary linotypes are to be cast.

The two matrix-quads 13 13 are formed right and left handed; but otherwise they are alike, and each is provided with a projection 14, adapted to fit into a recess 15, formed in the front face of the fudge-linotype mold-block 16 at each end of the mold-slot 17 thereof.

On the outer end of each of the vise-jaws 3 and 4 is provided an adjustable stop 18, pivoted to said jaw by a screw 19, which passes through a slot 20 in said stop, whereby the stops are capable of being readily moved into their effective positions, as in Figs. 1, 2, and 3, during the casting of ordinary linotypes and non-effective positions, as in Figs. 4, 5, 6, and 7, during the casting of fudge-linotypes. The stops 18 are provided with forwardly-projecting ends 21, which in the effective position of said stops—that is to say, during the casting of ordinary linotypes—as shown in Figs. 1, 2, and 3, are interposed between the vise-jaws 3 and 4 and the respective stop-screw 6 and stop-nut 8, the stops being supported in that position by the recessed portions 22 of their ends 21 resting on and against the lower vise-guide 5. When fudge-linotypes are to be cast, the stops 18 are slightly raised and their upper ends tilted forward to disengage the recessed ends 22 thereof from the lower vise-guide 5, after which they are lowered into their non-effective positions, as shown in Figs. 4, 5, 6, and 7, the vise-jaws 3 and 4 being then capable of outward movement as far as the ordinary stops 6 and 8. The stops 18 are provided at their upper ends with handles 23 for facilitating their manipulation.

When ordinary linotypes are to be cast, the mold-block 2, which is of the usual depth and construction, is used, the stops 18 are placed in their effective position, as shown in Figs. 1, 2, and 3, and the matrices without the before-described special matrix-quads 13 are clamped between the jaws 3 and 4, the subsequent casting being carried out as ordinarily and the resultant linotypes being of substantially the usual form which is indicated in partly-full and partly-dotted lines in Fig. 13. When, however, fudge-linotypes are to be cast, the operator detaches the ordinary mold-block 2 from the mold-wheel 1 and replaces it by a fudge mold-block 16 of about half the depth and width for producing fudge-linotypes having the same length of printing edge as the ordinary linotypes produced by the previously-mentioned mold-block 2, has a mold-slot 17, which is longer than that of the mold-block 2 by the extent of the length of the projections 24 of Fig. 16, which are to engage under the fudge-cavity ledges. The operator also affixes one of the special matrix-quads 13 to each of the vise-jaws and moves the stops 18 into their non-effective position, as shown in Figs. 4, 5, 6, and 7, and then in the usual manner composes a line of matrices 26, which is later introduced and clamped between the matrix-quads 13 13, as indicated in Figs. 7 and 8, preparatory to the casting operation which immediately thereafter ensues in the ordinary manner. The fudge-linotype resulting from this operation is or may be of the shape represented in full lines in Fig. 16.

Instead of affixing the special matrix-quads 13 13 to the vise-jaws 3 4, as previously described, the same result may be attained by the use of matrix-quads 32, such as represented in Fig. 12, these being composed by the operator at each end of the composed line of matrices in the assembly-box and outside the normal length of said line. The notch 33 of each of the matrix-quads 32 has no teeth, such as the teeth 34, Fig. 7, provided on the matrices 26, and consequently they are not carried upward to the distributing mechanism, but fall into the "sorts-box," from which the operator may take them for further use, according to requirements, the machine being equipped with as many of these quads 32 as may be necessary—say half a dozen—these all dropping into the sorts-box after removal from between the vise-jaws 3 4.

The length of the projections 24 on the finished fudge-linotype will vary in accordance with the thickness of the matrix-quads 13 or thickness or number of the matrix-quads 32 used, the production of long projections 24 being secured by employing either corresponding thick quads 13 or 32 or a number of quads 32 having an aggregate thickness corresponding to such desired length of the projections.

The adjustable stops 18 are usually of the same thickness as the matrix-quads 13 or 32 or aggregation of matrix-quads 32. It is to be understood that these stops are necessary only in such ordinary linotype-machines as are used for producing fudge-linotypes, the said stops serving during the casting of ordinary linotypes to advance the jaws 3 and 4 sufficiently to take up that portion of the space between said jaws which during the casting of fudge-linotypes is occupied by the matrix-quads 13 or 32. In linotype-machines used for producing only fudge-linotypes preferably the matrix-quads 13 will be used and the stops 18 may be entirely dispensed with.

It will be observed that the essence of our invention resides in providing the adjustable matrix-confining jaws with quads or matrices having projections to enter the ends of the mold at the front, so as to shorten the linotype at the printing edge, while permitting its base portion to be cast of full length, the result being a linotype having at the base projections or tenons extending beyond the limits of the printing-face as a means of securing such linotypes in place in the printing-press or elsewhere. While it is preferred to have the projections 14 on the quads wider vertically than the mold-slot, so that the mold must have recesses 15 to receive them, it will be understood that these proportions are not of the essence of the invention and that it is sufficient if the projections fill the ends of the mold-slot to limit the length of the slug at the front for a portion of its length.

We claim—

1. In a linotype-machine, the combination of the matrix-confining jaws, removable quads insertible between the jaws and matrices and having projections to enter the ends of the mold, a stop device for adjusting the jaws at a distance equal to the thickness of the quads; whereby the parts are adapted to coöperate with a mold for producing type-high matrices of uniform length, or with a mold for producing fudge-linotypes, longer at the base than at the printing edge.

2. In a linotype-machine, the combination of a mold having cavities 15 at the ends, matrix-confining jaws, and removable quads having projections to enter the cavities 15.

3. In a linotype-machine, having interchangeable molds 2 and 16, substantially as described, removable quads having projections to enter the ends of the last-named mold, and movable stops, adjustable between the jaws and their support, whereby the distance between the jaws may be varied as the use or non-use of the quads may demand.

4. In a linotype-machine, the adjustable matrix-confining jaws, in combination with the attachable and detachable quads 13, having projections to enter the ends of the mold.

5. In a linotype-machine, the combination of a slotted mold, having a cavity 15 extending laterally from the slot, and a quad or matrix having a projection adapted to enter said cavity.

In witness whereof we have hereunto set our hands in the presence of two witnesses.

RICHARD CORNELIUS ELLIOTT.
CHARLES HOLLIWELL.

Witnesses:
ARTHUR H. SMITH,
CHARLES H. O. POOK.